(12) United States Patent
Wang

(10) Patent No.: US 12,020,627 B2
(45) Date of Patent: Jun. 25, 2024

(54) PROCESSING METHOD AND APPARATUS

(71) Applicant: Lenovo (Beijing) Limited, Beijing (CN)

(72) Inventor: Yukun Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 170 days.

(21) Appl. No.: 17/689,941

(22) Filed: Mar. 8, 2022

(65) Prior Publication Data
US 2023/0075654 A1 Mar. 9, 2023

(30) Foreign Application Priority Data

Sep. 3, 2021 (CN) .......................... 202111031971.9

(51) Int. Cl.
*G09G 3/20* (2006.01)
(52) U.S. Cl.
CPC ... *G09G 3/2096* (2013.01); *G09G 2340/0407* (2013.01); *G09G 2354/00* (2013.01); *G09G 2360/04* (2013.01)
(58) Field of Classification Search
None
See application file for complete search history.

(56) References Cited

U.S. PATENT DOCUMENTS

| 2016/0188275 | A1* | 6/2016 | Huang | G06F 3/038 715/761 |
|---|---|---|---|---|
| 2019/0333479 | A1* | 10/2019 | Maalouf | G09G 5/14 |
| 2021/0142760 | A1* | 5/2021 | Kim | G09G 5/005 |

\* cited by examiner

*Primary Examiner* — Yi Wang
(74) *Attorney, Agent, or Firm* — ANOVA LAW GROUP, PLLC

(57) ABSTRACT

A processing method and its apparatus are provided in the present disclosure. The processing method includes obtaining a first display parameter of a first display; obtaining a second display parameter of a second display, where a first object is displayed by the first display and the second display, and determining a display adjustment parameter of the first object based on the first display parameter and the second display parameter, such that the second display adjusts display effect of the first object in the second display according to the display adjustment parameter; and a viewing angle of a second user viewing the first object on a side of the second display satisfies a first condition with a viewing angle of a first user viewing the first object on a side of the first display.

17 Claims, 5 Drawing Sheets

PROCESSING METHOD AND APPARATUS

CROSS-REFERENCE TO RELATED APPLICATION

This application claims the priority of Chinese Patent Application No. 202111031971.9, filed on Sep. 3, 2021, the content of which is incorporated herein by reference in its entirety.

TECHNICAL FIELD

The present disclosure generally relates to the field of processing technology, and, more particularly, relates to a processing method and a processing apparatus.

BACKGROUND

Currently, screen sharing has become a common scenario that users often face in their work. When sharing screen, due to factors such as different screen parameters and device sizes of presenters and participants, it may often cause the problem that the content viewed by participants is be too large or small, which may affect the users' viewing experience.

SUMMARY

One aspect of the present disclosure provides a processing method. The method includes obtaining a first display parameter of a first display; obtaining a second display parameter of a second display, where a first object is displayed by the first display and the second display, and determining a display adjustment parameter of the first object based on the first display parameter and the second display parameter, such that the second display adjusts display effect of the first object in the second display according to the display adjustment parameter; and a viewing angle of a second user viewing the first object on a side of the second display satisfies a first condition with a viewing angle of a first user viewing the first object on a side of the first display.

Another aspect of the present disclosure provides a processing apparatus. The apparatus includes a memory, storing a program for a processing method; and a processor coupled with the memory and configured, when the program being executed, to: obtain a first display parameter of a first display; obtain a second display parameter of a second display, where a first object is displayed by the first display and the second display, and determine a display adjustment parameter of the first object based on the first display parameter and the second display parameter, such that the second display adjusts display effect of the first object in the second display according to the display adjustment parameter; and a viewing angle of a second user viewing the first object on a side of the second display satisfies a first condition with a viewing angle of a first user viewing the first object on a side of the first display.

Another aspect of the present disclosure provides a non-transitory computer-readable storage medium, containing a computer program for, when executed by a processor, performing a processing method. The method includes obtaining a first display parameter of a first display; obtaining a second display parameter of a second display, where a first object is displayed by the first display and the second display, and determining a display adjustment parameter of the first object based on the first display parameter and the second display parameter, such that the second display adjusts display effect of the first object in the second display according to the display adjustment parameter; and a viewing angle of a second user viewing the first object on a side of the second display satisfies a first condition with a viewing angle of a first user viewing the first object on a side of the first display.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

DETAILED DESCRIPTION

The technical solutions in embodiments of the present disclosure are clearly and completely described below with reference to the accompanying drawings in embodiments of the present disclosure. Obviously, described embodiments are only a part of embodiments of the present disclosure, but not all embodiments. Based on embodiments in the present disclosure, all other embodiments obtained by those skilled in the art without creative efforts shall fall within the protection scope of the present disclosure.

Embodiments of the present disclosure can be applied to an electronic device. The present disclosure may not limit the product form of the electronic device. The electronic device may include, but not be limited to, a smart phone, a tablet computer, a wearable device, a personal computer (PC), a netbook, or the like, which may be selected according to application requirements.

Figure 1:
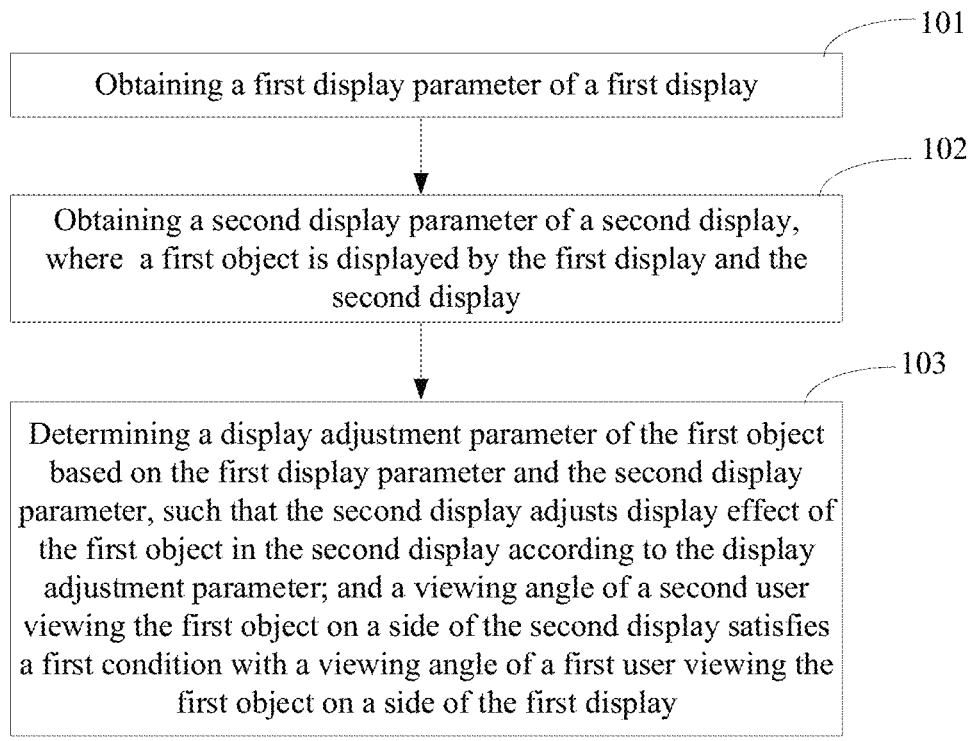
FIG. 1 illustrates a flowchart of an exemplary processing method according to various disclosed embodiments of the present disclosure.

FIG. 1 illustrates a flowchart of an exemplary processing method according to various disclosed embodiments of the present disclosure. Referring to FIG. 1, the processing method may include following exemplary steps.

At 101, the first display parameter of the first display may be obtained.

The processing method described in embodiments of the present disclosure may be applied to a server which implements that the first device may transmit target content to the second device for display and output. In an implementation, it may be that the first device shares content with the second device. For example, in the application scenario of a remote conference, the host may need to share a PPT file related to the conference content to electronic devices of other participants, such that all participants may watch the data content shared by the host through the display screens of their own devices. In other implementations, the first device may simply send target content to the second device. For example, a user A watched a game video, thought the video content was exciting, and wanted to share the game video to a user B who had similar interests, then the game video may simply be sent to the user B through a network.

It can be understood that in most cases, the display configuration of the electronic devices of different users may not be same. These configuration contents may include, but not be limited, to resolution and DPI (dots per inch). When same content is displayed on the first display, its viewing comfort may be relatively high. However, when the content is displayed on the second display, based on the display parameter configuration of the second display, the display effect of the second display may have problems, such as being excessively large, excessively small, unclear display content, and the like. The processing method described in the present disclosure is a solution for adjusting the display parameter of the display of a content receiver, so that the display effect for displaying the received content by the display on the receiver side may be same as or close to the display effect of the content sender.

During an implementation process of the processing method in one embodiment, the first display parameter of the first display may need to be obtained. Herein, the first display may be understood as the display on the side of the content sender in the above-mentioned description. The first display parameter of the first display may be obtained, which may be beneficial for determining the display effect of the sent content (which may be shared content) on the first display.

At 102, the second display parameter of the second display may be obtained, where the first display and the second display may display the first object.

After obtaining the first display parameter of the first display, it may need to obtain the second display parameter of the second display, similarly, to determine the display effect of the first object (the content sent above) on the second display. In such way, after the display parameters of the first display and the second display are determined, the display adjustment parameter corresponding to the second display for displaying the first object may be determined subsequently according to desired effect.

It should be noted that, the number of the second displays may be one, two or more, which may not be limited in one embodiment. When the number of second displays is two or more, determining corresponding display adjustment parameter may be performed for each second display subsequently, such that the display effect of each second display for displaying the first object may meet requirement.

At 103, a display adjustment parameter of the first object may be determined based on the first display parameter and the second display parameter, such that the second display may adjust the display effect of the first object in itself according to the display adjustment parameter, and the viewing angle of the second user viewing the first object on the side of the second display may satisfy the first condition with the viewing angle of the first user viewing the first object on the side of the first display.

Figure 2:
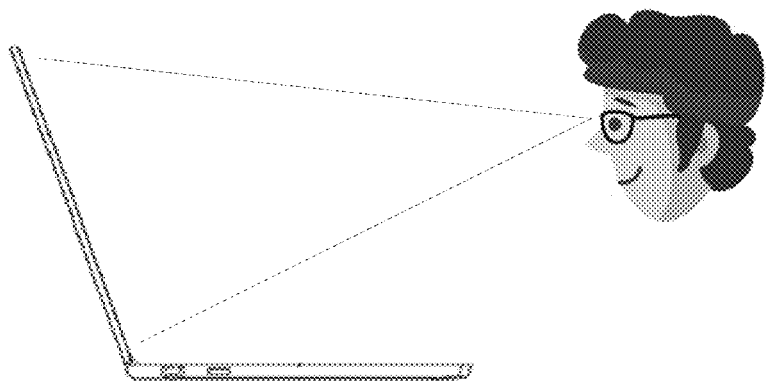
FIG. 2 illustrates a schematic of a viewing angle range of a user viewing a display according to various disclosed embodiments of the present disclosure.

The viewing angle refers to the angle formed by the line of sight, the display and the like along the vertical direction, that is, the angle formed by the light rays drawn from two ends of an object (up, down, or left, right) at the center of a human eye when viewing the object. The smaller the size of the object is and the further away from an observer is, the smaller the viewing angle is. It can be understood that when the user views the display, since the size of the display is fixed, the angle formed by the lines connecting two opposite boundaries of the display and the eye may be relatively large when the user is relatively close to the display, and the eyeball rotation range may be relatively large when the user views the content displayed on the display; and the angle formed by the lines connecting two opposite boundaries of the display and the eye may be relatively small when the user is far away from the display, and the eyeball rotation range may also be relatively small when the user views the content displayed on the display. FIG. 2 illustrates a schematic of a viewing angle range of a user viewing a display according to various disclosed embodiments of the present disclosure. The meaning of the viewing angle may be understood in conjunction with FIG. 2.

Normally, when the user views the display, the user may automatically adjust the distance between himself and the display according to the size of the display, so that the eyes may be in a relatively comfortable position relative to the display. Based on above, considering that the display parameters of different displays are different and ensuring the user's experience of viewing the first object on the side of the second display, the processing method in one embodiment may automatically determine the display adjustment parameter of the first object according to the first display parameter and the second display parameter. In such way, the second display may adjust the display effect of the first object in the second display according to the display adjustment parameter subsequently, and it realizes that the viewing angle of the second user on the side of the second display viewing the first object may be same as the viewing angle of the first user viewing the first object on the side of the first display or the difference between these two viewing angles may be less than a set value, that is, the first condition may be satisfied. In such way, it can be ensured that display effects of the first display and the second display may be same or similar.

There are different implementation manners of how to determine the display adjustment parameter in detail, and its content is described in detail in following embodiments, which may not be described in detail herein.

For the processing method described in one embodiment, the display parameter of the first object on the second display may be adjusted based on the display parameter of the first object on the first display, such that the users on two display sides may have same experience of viewing the first object on respective displays, and the user may comfortably watch the content corresponding to the first object without manually adjusting the display parameter in the process of displaying the first object on the side of the second display, which may effectively optimize user experience.

Figure 3:
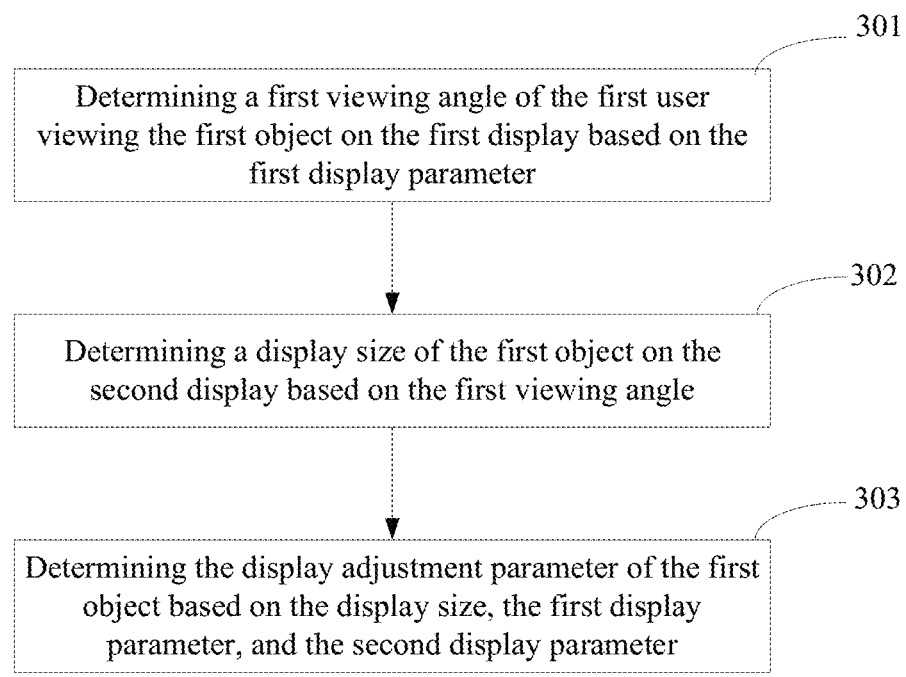
FIG. 3 illustrates a flowchart of determining a display adjustment parameter according to various disclosed embodiments of the present disclosure.

FIG. 3 illustrates a flowchart of determining a display adjustment parameter according to various disclosed embodiments of the present disclosure. Referring to FIG. 3, in one implementation, determining the display adjustment parameter of the first object based on the first display parameter and the second display parameter may include following exemplary steps.

At 301, the first viewing angle of the first user viewing the first object on the first display may be determined based on the first display parameter.

The display size of the first object on the first display may be determined based on the first display parameter, such as resolution and DPI. Through the image capturing device on the side of the first display, the first distance between the first user and the first display may be obtained. In such way, when the size of the display picture of the first object and the first distance are determined, the first viewing angle of the first user viewing the first object may be calculated and determined.

Based on the above, determining the first viewing angle may include determining the first distance between the first user and the first display through the first image captured by the first image capturing device; and determining the first viewing angle of the first user viewing the first display based on the first distance and the display boundary of the first object displayed by the first display.

At 302, a display size of the first object on the second display may be determined based on the first viewing angle.

The image capturing device on the side of the second display may also obtain the second distance between the second user and the second display, such that combined with known second viewing angle, the display size of the first object on the second display may be determined.

At 303, the display adjustment parameter of the first object may be determined based on the display size, the first display parameter, and the second display parameter.

On the premise that the first display parameter of the first display and the second display parameter of the second display are known, the display size of the first object on the second display may be determined, and then the display adjustment parameter of the first object, for example, the resolution of the first object, may be adjusted based on the display size. In such way, after the second display adjusts the first object based on the display adjustment parameter, the display boundary of the first object may just be in the display region corresponding to the display size.

Figure 4:
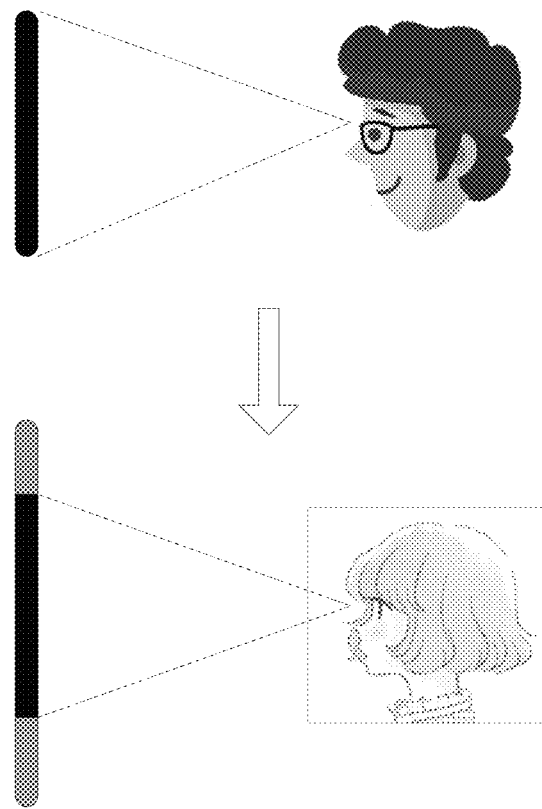
FIG. 4 illustrates a state schematic of a first object being displayed on a first display and a second display according to various disclosed embodiments of the present disclosure.

FIG. 4 illustrates a state schematic of a first object being displayed on a first display and a second display according to various disclosed embodiments of the present disclosure. The size of the second display is relatively large, and under the effect that the viewing angle of the second user on the side of the second display viewing the first object is same or similar to the viewing angle of the first object viewing by the first user on the side of the first display, the display size of the first object on the second display may be smaller than the size of the second display. The range marked in black on the display may be the display range of the first object, and the above-mentioned content may be understood with reference to FIG. 4.

In another implementation, both the first display parameter and the second display parameter may include DPI (dots per inch), such that determining the display adjustment parameter of the first object based on the first display parameter and the second display parameter may include that the display adjustment parameter may be determined based on the DPI of the first display and the DPI of the second display.

In an implementation, the ratio of the DPI of the first display to the DPI of the second display may be determined as the display adjustment parameter.

In one embodiment of a remote conference, the resolution of a presenter's screen (the first display) is $x_1 \times y_1$, and the DPI is $a_1$; the resolution of a participant's screen (the second display) is $x_2 \times y_2$, and the DPI is $a_2$; and above display parameters may be synchronized to the server. Pre-processing performed on the server side may be that by scaling the shared screen at the receiver (the second display side), the resolution of the shared content (the first object) which is actually displayed by the receiver is $$\frac{a_2}{a_1} x_1 \times \frac{a_2}{a_1} y_1.$$

That is, the text and icon size may be consistent with the operating system (OS) settings of the receiver. That also is, the shared content may be automatically processed at the receiver, so that the visual effect (such as text, icon size and the like) may be consistent with the visual effect corresponding to the receiver's own configuration.

Figure 5:
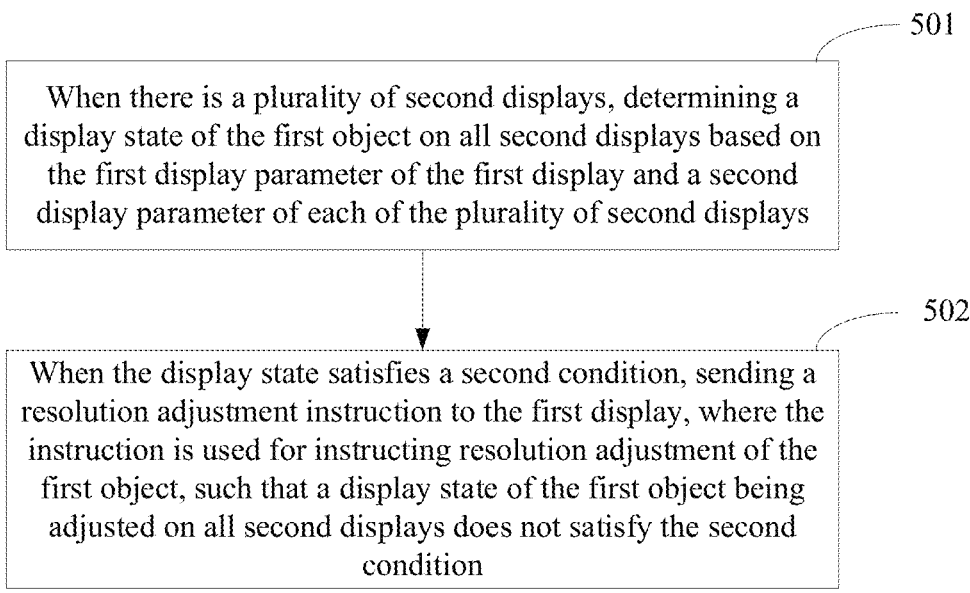
FIG. 5 illustrates a flowchart of a processing method in a multiple second display scenario according to various disclosed embodiments of the present disclosure.

FIG. 5 illustrates a flowchart of a processing method in a multiple second display scenario according to various disclosed embodiments of the present disclosure. Referring to FIG. 5, in other implementations, the processing method may further include following exemplary steps.

At 501, when there is a plurality of second displays, the display state of the first object on all second displays may be determined based on the first display parameter of the first display and the second display parameter of each of the plurality of second displays.

At 502, when the display state satisfies the second condition, a resolution adjustment instruction may be sent to the first display, where the instruction is used for instructing resolution adjustment of the first object, such that a display state of the first object being adjusted on all second displays does not satisfy the second condition.

The second condition may indicate that a number of second displays exceeding a certain percentage of a total quantity of all second displays are unable to completely display the first object after being adjusted according to the display adjustment parameter. In such way, the display state of the first object being adjusted on all displays may not satisfy the second condition. That is, to adapt to most second displays, most displays may completely display the display picture of the first object.

Following the previous example of adjusting resolution, if $$\frac{a_2}{a_1} x_1 \leq x_2 \text{ and } \frac{a_2}{a_1} y_1 \leq y_2,$$

it may indicate that the receiver's screen may completely display the desktop of the sender, and the server may record the number $b_1$ of receivers that satisfy such condition; and if $$\frac{a_2}{a_1} x_1 > x_2 \text{ or } \frac{a_2}{a_1} y_1 > y_2,$$

it may indicate that the receiver's screen may not fully display the sender's desktop, and the server may record the number $b_2$ of receivers that satisfy such condition.

If $b_2 > \alpha b_1$ (corresponding to the second condition), where $\alpha > 0$ is a configurable parameter, it determines that the screen resolution of the sender needs to be adjusted. For example, the resolution of the sender's screen may be lowered, so that most receivers may completely display the sender's desktop (corresponding to the shared content); and the server may notify the sender, so that the sender may be switched to the maximum resolution $x_1' \times y_1'$ that satisfies $b_2 \leq b_1$ and is supported by the sender. In such way, updated $x_1'$ and $y_1'$ may be used to scale the shared picture at the receiver, so that the resolution of the shared content actually displayed by the receiver may be $$\frac{a_2}{a_1} x_1' \times \frac{a_2}{a_1} y_1'.$$

It should be noted that, after decoding at the receiver, the shared content may be processed frame-by-frame; only when the image change of the desktop of the sender is detected, for example, the image change is determined by a manner including image subtraction and the like, the shared content may be recalculated, updated, and displayed at the receiver, which may save traffic and improve performance.

Figure 6:
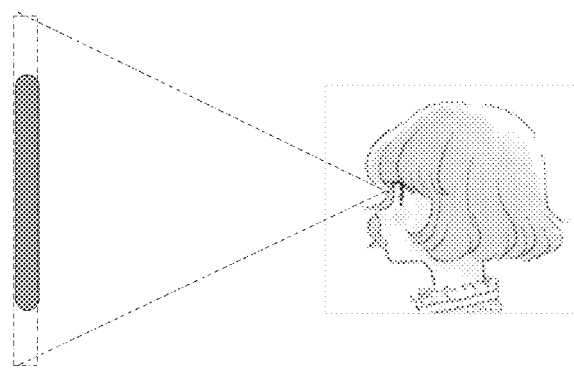
FIG. 6 illustrates a schematic of a second display that is not able to completely display a first object after being adjusted based on a display adjustment parameter according to various disclosed embodiments of the present disclosure.

In some cases, even if the resolution of the first display is adjusted, there are still a few cases where the second display cannot completely display the first object. FIG. 6 illustrates a schematic of a second display that is not able to completely display a first object after being adjusted based on a display adjustment parameter according to various disclosed embodiments of the present disclosure. The gray region is the second display, and the range indicated by the dotted box is the theoretical display range of the first object after the resolution is adjusted. In such case, the processing method may further include that when it determines that the second display cannot completely display the first object after adjusting the first object according to the display adjustment parameter, the first display mode instruction may be sent to the second display. In the first display mode, only the core region of the first object may be displayed on the second display. The core region may be a display region determined using the cursor position as a reference on the first display. The core region may be smaller than the region corresponding to the display content.

In other implementations, in the first display mode, a thumbnail image of the first object may be also displayed on the second display, and the thumbnail image may have identification information for indicating the core region.

For example, the core region of the first object may be dynamically displayed at the receiver according to the moving position of a user's mouse on the sender (it may also be the user's mouse on the receiver; and the user's mouse on the sender is used as an example); and a reduced version of the full-screen overview image of the sender may be displayed. In the overview image, the region currently being displayed on the screen of the receiver may be circled by a rectangle. The calculation method of the size of the region displayed on the screen of the receiver is described in the following content.

As mentioned above, it is known that the screen resolution of the receiver is $x_2 \times y_2$, and the DPI is $a_2$; and the updated resolution of the sender is $x_1' \times y_1'$, and the DPI is $a_1$. The sender content resolution adjusted by above-mentioned calculation method that the receiver should display is $$\frac{a_2}{a_1} x_1' \times \frac{a_2}{a_1} y_1',$$

but the sender's content may not be displayed completely, that is, $$\frac{a_2}{a_1} x_1' > x_2 \text{ or } \frac{a_2}{a_1} y_1' > y_2.$$

The calculation method of an initial display region (that is, the region displayed on the screen of the receiver when starting to share the screen) is described first.

If $$\frac{a_2}{a_1} x_1' > x_2,$$

the sender's content that can be displayed by the receiver is $$x_2 \times \frac{a_2}{a_1} y_1'$$

(that is, cannot be displayed completely along the horizontal direction, but can be displayed along the vertical direction). The sender may send the real-time horizontal position of its mouse on its own screen $x_0 (x_0 \leq x_1')$ to the server, then the adjusted horizontal position that the mouse should display is $$\frac{a_2}{a_1} x_0'.$$

Figure 7:
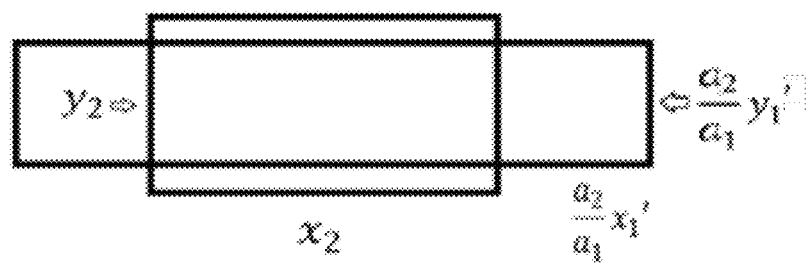
FIG. 7 illustrates a positional relationship schematic of a region displayed on a receiver screen along a horizontal direction when starting to share screen according to various disclosed embodiments of the present disclosure.

FIG. 7 illustrates a positional relationship schematic of a region displayed on a receiver screen along a horizontal direction when starting to share screen according to various disclosed embodiments of the present disclosure.

In conjunction with FIG. 7, (1) if $$\frac{a_2}{a_1} x_0' - \frac{x_2}{2} > 0 \text{ and } \frac{a_2}{a_1} x_0' + \frac{x_2}{2} < \frac{a_2}{a_1} x_1',$$

then taking the mouse as the horizontal center, left and right $$\frac{x_2}{2}$$

width regions of the region that should be displayed may be displayed; (2) if $$\frac{a_2}{a_1} x_0' - \frac{x_2}{2} \leq 0,$$

left $x_2$ width region of the region that should be displayed may be displayed; and (3) if $$a\frac{a_2}{a_1} x_0' + \frac{x_2}{2} \geq \frac{a_2}{a_1} x_1',$$

right $x_2$ width region of the region that should be displayed may be displayed.

If $$\frac{a_2}{a_1} y_1' > y_2,$$

the sender's content that can be displayed by the receiver is $$\frac{a_2}{a_1} x_1' \times y_2$$

(that is, can be displayed completely along the horizontal direction, but not along the vertical direction). The sender may send the real-time vertical position y of its mouse on its own screen to the server $y(y_0 \leq y_1')$, then the adjusted vertical position that the mouse should display is $$\frac{a_2}{a_1} y_0'.$$

Figure 8:
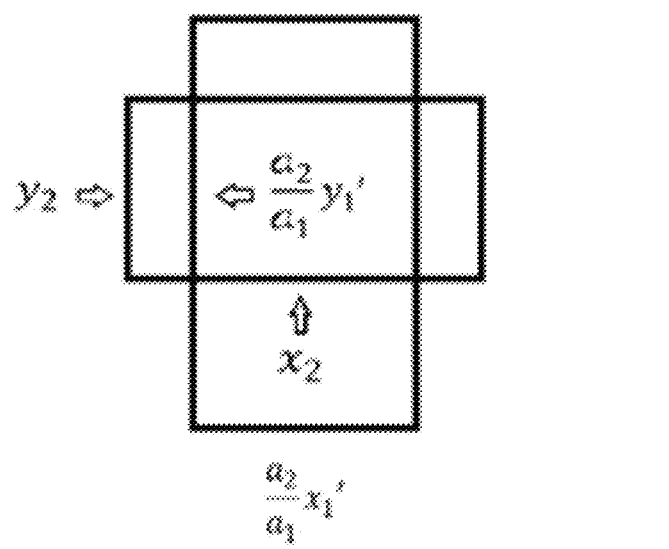
FIG. 8 illustrates a positional relationship schematic of a region displayed on a receiver screen along a vertical direction when starting to share screen according to various disclosed embodiments of the present disclosure.

FIG. 8 illustrates a positional relationship schematic of a region displayed on a receiver screen along a vertical direction when starting to share screen according to various disclosed embodiments of the present disclosure.

In conjunction with FIG. 8, (1) if $$\frac{a_2}{a_1} y_0' - \frac{y_2}{2} > 0 \text{ and } \frac{a_2}{a_1} y_0' + \frac{y_2}{2} < \frac{a_2}{a_1} y_1',$$

then taking the mouse as the vertical center, upper and lower $$\frac{y_2}{2}$$

height regions or the region that should be displayed may be displayed; (2) if $$\frac{a_2}{a_1} y_0' - \frac{y_2}{2} \leq 0, y_2$$

height region below the region that should be displayed may be displayed; and (3) if $$\frac{a_2}{a_1} y_0' + \frac{y_2}{2} \geq \frac{a_2}{a_1} y_1', y_2$$

height region above the region that should be displayed may be displayed.

Based on the above description, in the first display mode, when the distance between the cursor in the core region and the display boundary of the second display is less than the set value, the display content of the core region may be dynamically adjusted by following the cursor movement.

Although the core region is fixed, the content in the core region may move with the movement of the mouse on the sender side. The following describes how to update the display region (that is, how to update the display region when the user moves the mouse, where the horizontal direction is taken as an example, which is same for the vertical direction). Considering the user experience, the region displayed on the receiver should not change frequently. Therefore, only when the user's mouse is located within d pixels of the upper/lower/left/right edge of the receiver screen (d is a configurable parameter), it determines that the region displayed on the receiver may need to be updated.

The sender may send the real-time position $x_0(x_0 \leq x_1')$ of its mouse along the horizontal direction on its own screen to the server, so that the adjusted horizontal position of the mouse that should be displayed on the receiver screen may be:

$$\frac{a_2}{a_1} x_0'$$

(1) If $$\frac{a_2}{a_1} x_0' - d < 0,$$

that is, the mouse is close to the left edge of the receiver screen, then the display content may move left by m $$(m = d - \frac{a_2}{a_1} x_0')$$

as a whole based on the original display region, that is, the distance between the mouse and the left edge of the screen at the receiver may be kept as d; and if remaining display content is not enough to move left by m, an actual remaining distance may be moved; and (2) If $$\frac{a_2}{a_1} x_0' + d > x_2,$$

that is, the mouse is close to the right edge of the receiver screen, then the display content may move right by n $$(n = d + \frac{a_2}{a_1} x_0' - x_2))$$

as a whole based on the original display region, that is, the distance between the mouse and the right edge of the screen at the receiver may be kept as d; and if remaining display content is not enough to move right by n, an actual remaining distance may be moved.

The above describes the display processing methods for various situations in the application scenario including multiple second displays in detail. During an implementation process of the method, the content corresponding to the first object may be viewed at the side of the second display comfortably without requiring the user to manually adjust the display parameter, thereby effectively optimizing the user experience.

For simplicity, the above-mentioned method embodiments are all expressed as a series of action combinations. However, those skilled in the art should know that the present disclosure is not limited by described sequence of actions, because according to the present disclosure, certain steps may be performed in other sequences or simultaneously. Secondly, those skilled in the art should also know that embodiments described in the present disclosure are all optional embodiments, and actions and modules involved are not necessarily required by the present disclosure.

Above-mentioned embodiments disclosed in the present disclosure describe the processing method in detail, and the method of the present disclosure can be implemented by various forms of apparatuses. Therefore, the present disclosure also provides an apparatus described in detail through various embodiments.

Figure 9:
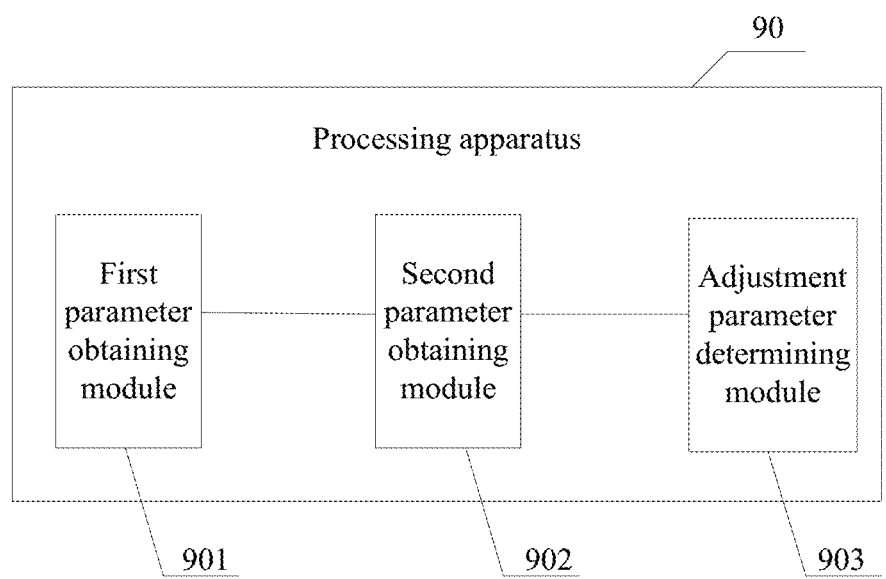
FIG. 9 illustrates a receiving schematic of a processing apparatus according to various disclosed embodiments of the present disclosure.

FIG. 9 illustrates a receiving schematic of a processing apparatus according to various disclosed embodiments of the present disclosure. The processing apparatus 90 may include the first parameter obtaining module 901, configured to obtain the first display parameter of the first display; the second parameter obtaining module 902, configured to obtain the second display parameter of the second display, where the first display and the second display may display the first object; and further include an adjustment parameter determining module 903, configured to determine the display adjustment parameter of the first object based on the first display parameter and the second display parameter, such that the second display may adjust the display effect of the first object in itself according to the display adjustment parameter, and the viewing angle of the second user viewing the first object on the side of the second display may satisfy the first condition with the viewing angle of the first user of viewing the first object on the side of the first display.

For the processing method described in one embodiment, the display parameter of the first object on the second display may be adjusted based on the display parameter of the first object on the first display, such that the users on two display sides may have same experience of viewing the first object on respective displays, and the user may comfortably watch the content corresponding to the first object without manually adjusting the display parameter in the process of displaying the first object on the side of the second display, which may effectively optimize the user experience.

In an implementation, the adjustment parameter determining module may be configured to determine the first viewing angle of the first user viewing the first object on the first display based on the first display parameter; determine the display size of the first object on the second display based on the first viewing angle; and determine the display adjustment parameter of the first object based on the display size, the first display parameter and the second display parameter.

In an implementation, determining the first viewing angle may include determining the first distance between the first user and the first display through the first image captured by the first image capturing device; and determining the first viewing angle of the first user viewing the first display based on the first distance and the display boundary of the first object displayed by the first display.

In one implementation, the first display parameter and the second display parameter both include DPI; and the adjustment parameter determining module may be configured to determine the display adjustment parameter of the first object based on the DPI of the first display and the DPI of the second display.

In an implementation, the adjustment parameter determination module may be configured to determine the ratio of the DPI of the first display to the DPI of the second display as the display adjustment parameter.

In an implementation, the adjustment parameter determination module may be further configured to, when there is a plurality of second displays, determine the display state of the first object on all second displays based on the first display parameter of the first display and the second display parameter of each of the plurality of second displays; and when the display state satisfies the second condition, send the resolution adjustment instruction to the first display, where the instruction is used for instructing resolution adjustment of the first object, such that the display state of the first object being adjusted on all second displays does not satisfy the second condition. The second condition may indicate that a number of second displays exceeding a certain percentage of a total quantity of all second displays are unable to completely display the first object after being adjusted according to the display adjustment parameter.

In an implementation, the adjustment parameter determination module may be further configured to, when it determines that the second display cannot completely display the first object after adjusting the first object according to the display adjustment parameter, send the first display mode instruction to the second display. In the first display mode, only the core region of the first object may be displayed on the second display. The core region may be a display region determined using the cursor position as a reference on the first display. The core region may be smaller than the region corresponding to the display content.

In an implementation, in the first display mode, a thumbnail image of the first object may be also displayed on the second display, and the thumbnail image may have identification information for indicating the core region.

In an implementation, in the first display mode, when the distance between the cursor in the core region and the display boundary of the second display is less than the set value, the display content of the core region may be dynamically adjusted by following the movement of the cursor.

Any one of the processing apparatuses described in above-mentioned embodiments may include a processor and a memory. The first parameter obtaining module, the second parameter obtaining module, the adjustment parameter determining module and the like in above-mentioned embodiments may all be stored in the memory as program modules, and the processor may execute above-mentioned program modules stored in the memory to realize corresponding functions.

The processor may include a kernel, and the kernel may call a corresponding program module from the memory. The kernel may be one or more and realize the processing of return data by adjusting kernel parameters.

The memory may include non-persistent memory in computer readable media, random access memory (RAM), and/or non-volatile memory in the form of read only memory (ROM) or flash memory (flash RAM). The memory may include at least one memory chip.

Embodiments of the present disclosure provide a storage medium on which a program is stored, and when the program is executed by a processor, the processing methods described in above-mentioned embodiments may be implemented.

Embodiments of the present disclosure provide a processor, where the processor is configured to execute a program. The processing method described in above-mentioned embodiments may be executed when the program is executed.

Furthermore, embodiments of the present disclosure provide an electronic device including a processor and a memory. The memory may be configured to store executable instructions of the processor, and the processor may be configured to execute the processing methods described in above-mentioned embodiments by executing the executable instructions.

Compared with the existing technology, the technical solutions provided by the present disclosure may achieve at least the following beneficial effects.

The present disclosure provides the processing method and the processing apparatus. The method includes obtaining the first display parameter of the first display; obtaining the second display parameter of the second display, where the first object is displayed by the first display and the second display, and determining the display adjustment parameter of the first object based on the first display parameter and the second display parameter, such that the second display adjusts display effect of the first object in the second display according to the display adjustment parameter, and the viewing angle of the second user viewing the first object on the side of the second display may satisfy the first condition with the viewing angle of the first user viewing the first object on the side of the first display. For the solutions provided in the present disclosure, the display parameter of the first object on the second display may be adjusted based on the display parameter of the first object on the first display, such that the users on two display sides may have same experience of viewing the first object on respective displays, and the user may comfortably watch the content corresponding to the first object without manually adjusting the display parameters in the process of displaying the first object on the side of the second display, which may effectively optimize the user experience.

Various embodiments in the present disclosure may be described in a progressive manner, and each embodiment may focus on the difference from other embodiments, and same and similar parts between various embodiments may be referred to each other. As for the apparatus disclosed in the present disclosure, since it corresponds to the method disclosed in embodiments, the description may be relatively simple, and the relevant part may be referred to the description of the method.

It should also be noted that in the present disclosure, relational terms such as first, second and the like may be merely used to distinguish one entity or operation from another entity or operation and may not necessarily require or imply any such actual relationship or order between these entities or operations. Moreover, the terms "include", "contain" or any other variations thereof may be intended to cover non-exclusive inclusion, so that a process, method, article, or equipment that includes a series of elements includes not only those elements, but also other elements that are not explicitly listed, or also includes elements inherent to the process, method, article, or equipment. If there are no more restrictions, the elements defined by the sentence "include . . . " does not exclude the existence of other same elements in the process, method, article, or equipment that includes the elements.

Steps of the method or procedure described in connection with embodiments disclosed herein may be directly implemented in hardware, a software module executed by a processor, and/or a combination thereof. Software modules may be stored in random access memory (RAM), internal memory, read only memory (ROM), electrically programmable ROM, electrically erasable programmable ROM, registers, hard disks, removable disks, CD-ROM, or any other known form of storage medium in the existing technology.

Above description of disclosed embodiments may enable those skilled in the art to make or use the present disclosure. Various modifications to these embodiments may be readily apparent to those skilled in the art, and the generic principles defined herein may be implemented in other embodiments without departing from the spirit or scope of the present disclosure. Therefore, the present disclosure may not be intended to be limited to embodiments of the present disclosure but may be accorded the widest scope consistent with the principles and novel features disclosed herein.

What is claimed is:
1. A processing method, comprising:
obtaining a first display parameter of a first display;
obtaining a second display parameter of a second display, wherein a first object is displayed by the first display and the second display,
determining a display adjustment parameter of the first object based on the first display parameter and the second display parameter, such that the second display adjusts display effect of the first object in the second display according to the display adjustment parameter; and a viewing angle of a second user viewing the first object on a side of the second display satisfies a first condition with a viewing angle of a first user viewing the first object on a side of the first display;
when there is a plurality of second displays, determining a display state of the first object on all second displays based on the first display parameter of the first display and a second display parameter of each of the plurality of second displays; and
when the display state satisfies a second condition, sending a resolution adjustment instruction to the first display, wherein the instruction is used for instructing resolution adjustment of the first object, such that a display state of the first object being adjusted on all second displays does not satisfy the second condition, and the second condition indicates that a number of second displays exceeding a certain percentage of a total quantity of all second displays are unable to completely display the first object after being adjusted according to the display adjustment parameter.

2. The method according to claim 1, wherein determining the display adjustment parameter of the first object based on the first display parameter and the second display parameter includes:
determining a first viewing angle of the first user viewing the first object on the first display based on the first display parameter;
determining a display size of the first object on the second display based on the first viewing angle; and
determining the display adjustment parameter of the first object based on the display size, the first display parameter, and the second display parameter.

3. The method according to claim 2, wherein determining the first viewing angle includes:
determining a first distance between the first user and the first display through a first image captured by a first image capturing device; and
determining the first viewing angle of the first user viewing the first display based on the first distance and a display boundary of the first object displayed on the first display.

4. The method according to claim 1, wherein:
both the first display parameter and the second display parameter include dots per inch (DPI), such that determining the display adjustment parameter of the first object based on the first display parameter and the second display parameter includes:
    determining the display adjustment parameter based on the DPI of the first display and the DPI of the second display.
5. The method according to claim 4, wherein determining the display adjustment parameter based on the DPI of the first display and the DPI of the second display includes:
    determining a ratio of the DPI of the first display to the DPI of the second display as the display adjustment parameter.
6. The method according to claim 1 further including:
    when determining that the second display is unable to completely display the first object after being adjusted according to the display adjustment parameter, sending a first display mode instruction to the second display, wherein in a first display mode, only a core region of the first object is displayed on the second display; the core region is a display region determined using a position of a cursor as a reference on the first display; and the core region is smaller than a region corresponding to display content.
7. The method according to claim 6, wherein:
    in the first display mode, a thumbnail image of the first object is also displayed on the second display, and the thumbnail image has identification information for indicating the core region.
8. The method according to claim 6, wherein:
    in the first display mode, when a distance between the cursor in the core region and a display boundary of the second display is less than a set value, display content of the core region is dynamically adjusted by following cursor movement.
9. A processing apparatus, comprising:
    a memory, storing a program for a processing method; and
    a processor coupled with the memory and configured, when the program being executed, to:
        obtain a first display parameter of a first display;
        obtain a second display parameter of a second display, wherein a first object is displayed by the first display and the second display,
        determine a display adjustment parameter of the first object based on the first display parameter and the second display parameter, such that the second display adjusts display effect of the first object in the second display according to the display adjustment parameter; and a viewing angle of a second user viewing the first object on a side of the second display satisfies a first condition with a viewing angle of a first user viewing the first object on a side of the first display;
        when there is a plurality of second displays, determine a display state of the first object on all second displays based on the first display parameter of the first display and a second display parameter of each of the plurality of second displays; and
        when the display state satisfies a second condition, send a resolution adjustment instruction to the first display, wherein the instruction is used for instructing resolution adjustment of the first object, such that a display state of the first object being adjusted on all second displays does not satisfy the second condition, and the second condition indicates that a number of second displays exceeding a certain percentage of a total quantity of all second displays are unable to completely display the first object after being adjusted according to the display adjustment parameter.
10. The apparatus according to claim 9, wherein to determine the display adjustment parameter of the first object based on the first display parameter and the second display parameter, the processor is configured to:
    determine a first viewing angle of the first user viewing the first object on the first display based on the first display parameter;
    determine a display size of the first object on the second display based on the first viewing angle; and
    determine the display adjustment parameter of the first object based on the display size, the first display parameter, and the second display parameter.
11. The apparatus according to claim 10, wherein, to determine the first viewing angle, the processor is configured to:
    determine a first distance between the first user and the first display through a first image captured by a first image capturing device; and
    determine the first viewing angle of the first user viewing the first display based on the first distance and a display boundary of the first object displayed on the first display.
12. The apparatus according to claim 9, wherein:
    both the first display parameter and the second display parameter include dots per inch (DPI), such that determining the display adjustment parameter of the first object based on the first display parameter and the second display parameter includes:
    determining the display adjustment parameter based on the DPI of the first display and the DPI of the second display.
13. The apparatus according to claim 12, wherein to determine the display adjustment parameter based on the DPI of the first display and the DPI of the second display, the processor is configured to:
    determine a ratio of the DPI of the first display to the DPI of the second display as the display adjustment parameter.
14. The apparatus according to claim 9, wherein the processor is further configured to:
    when determining that the second display is unable to completely display the first object after being adjusted according to the display adjustment parameter, send a first display mode instruction to the second display, wherein in a first display mode, only a core region of the first object is displayed on the second display; the core region is a display region determined using a position of a cursor as a reference on the first display; and the core region is smaller than a region corresponding to display content.
15. The apparatus according to claim 14, wherein:
    in the first display mode, a thumbnail image of the first object is also displayed on the second display, and the thumbnail image has identification information for indicating the core region.
16. The apparatus according to claim 14, wherein:
    in the first display mode, when a distance between the cursor in the core region and a display boundary of the second display is less than a set value, display content of the core region is dynamically adjusted by following cursor movement.

17. A non-transitory computer-readable storage medium, containing a computer program for, when executed by a processor, performing a processing method, the method comprising:

obtaining a first display parameter of a first display;

obtaining a second display parameter of a second display, wherein a first object is displayed by the first display and the second display, and determining a display adjustment parameter of the first object based on the first display parameter and the second display parameter, such that the second display adjusts display effect of the first object in the second display according to the display adjustment parameter; and a viewing angle of a second user viewing the first object on a side of the second display satisfies a first condition with a viewing angle of a first user viewing the first object on a side of the first display;

when there is a plurality of second displays, determining a display state of the first object on all second displays based on the first display parameter of the first display and a second display parameter of each of the plurality of second displays; and when the display state satisfies a second condition, sending a resolution adjustment instruction to the first display, wherein the instruction is used for instructing resolution adjustment of the first object, such that a display state of the first object being adjusted on all second displays does not satisfy the second condition, and the second condition indicates that a number of second displays exceeding a certain percentage of a total quantity of all second displays are unable to completely display the first object after being adjusted according to the display adjustment parameter.

* * * * *